2 Sheets--Sheet 1.

D. M. KING & G. E. KING.

Potato-Diggers.

No. 137,931. Patented April 15, 1873.

Witnesses:
G. Mathys
Colon C. Kenon

Inventor:
David M. King
George E. King
PER
Attorneys.

2 Sheets--Sheet 2.

D. M. KING & G. E. KING.
Potato-Diggers.

No. 137,931. Patented April 15, 1873.

Witnesses:
G. Mathys
Colon C Kernon

Inventor:
David M. King
George E. King
Per
Attorneys.

UNITED STATES PATENT OFFICE.

DAVID M. KING AND GEORGE E. KING, OF MANTUA STATION, OHIO.

IMPROVEMENT IN POTATO-DIGGERS.

Specification forming part of Letters Patent No. 137,931, dated April 15, 1873; application filed February 4, 1873.

*To all whom it may concern:*

Be it known that we, DAVID M. KING and GEORGE E. KING, of Mantua Station, in the county of Portage and State of Ohio, have invented a new and useful Improvement in Potato-Diggers; and we do hereby declare the following to be a full, clear, and exact description of the same, reference being had to the accompanying drawing forming a part of this specification, in which—

Figure 1:
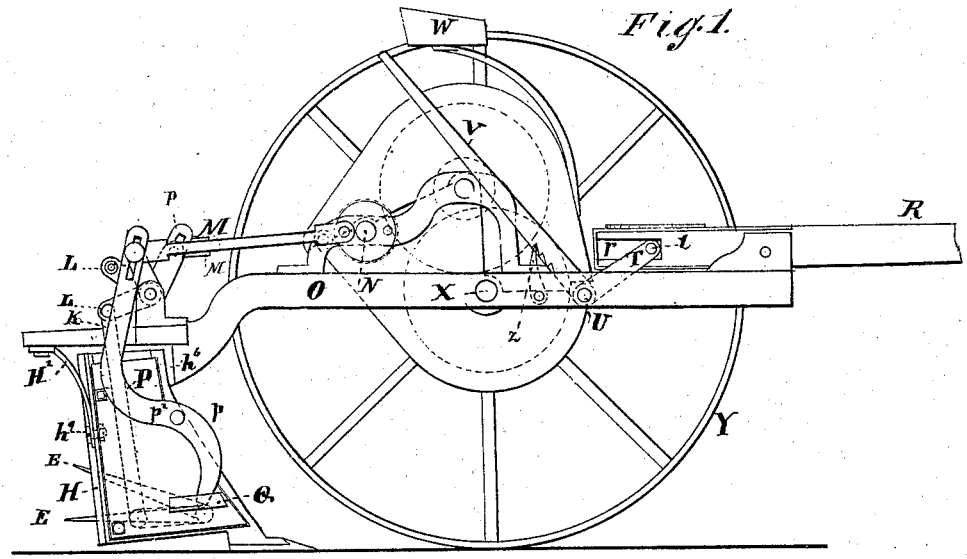
Figure 2:
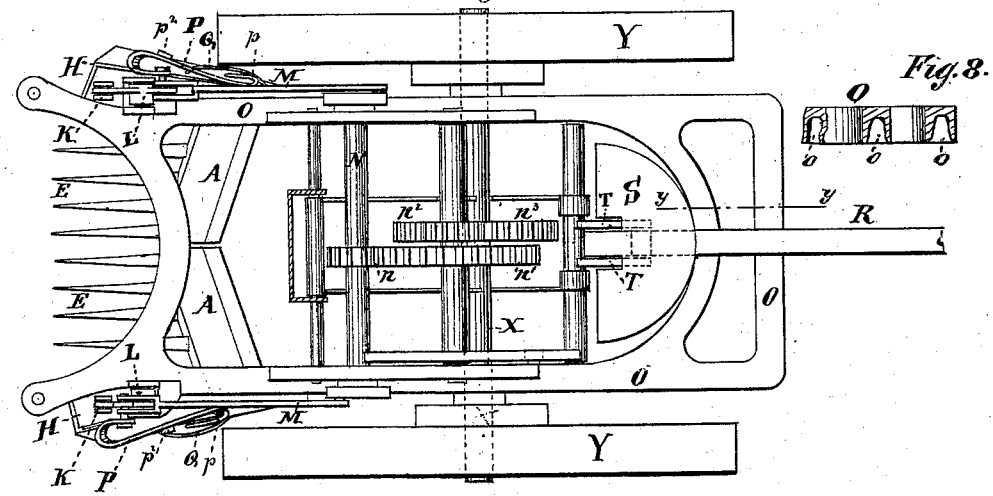
Figure 3:
Figure 3:
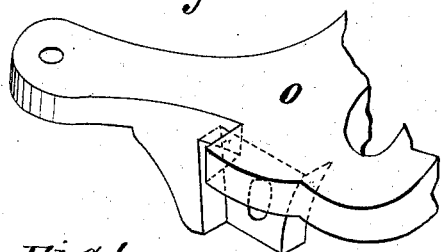
Figure 5:
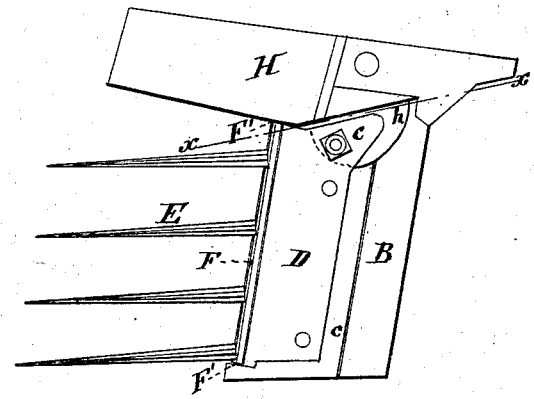
Figure 4:
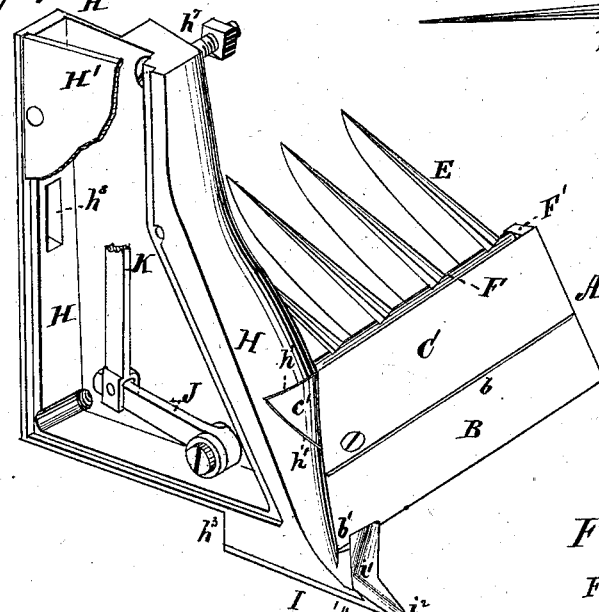
Figure 7:
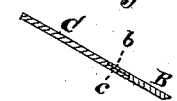
Figure 6:
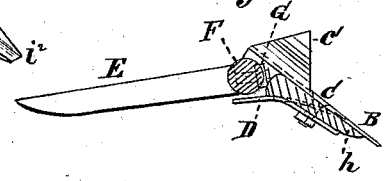

Figure 1 is a side elevation, one wheel being taken off. Fig. 2 is a top view. Fig. 3 is a perspective view of end of frame supporting digging apparatus. Fig. 4 is a perspective view of digging apparatus. Fig. 5 is a bottom view thereof. Fig. 6 is a vertical section through line $x\ x$ of Fig. 5. Fig. 7 is a vertical section of cutter-stock and cutter, and Fig. 8 is a section of frame in line $y\ y$ of Fig. 2.

The invention consists in the improvement of potato-diggers, as hereinafter described and claimed.

In the drawing, A A represent the shovels of a potato-digger, which are intended to go beneath the roots of the potato, lift the mellow soil with the bulbs therein, and allow it to pass over their rear edges. These shovels are made of thin plates of steel, which possess more or less elasticity, and are preferably made in two parts, B C, so that the narrow cutters B may be easily replaced when the edges of two shovels cease to correspond, or are worn too far back to cut properly. The cutter B is also recessed on the lower part of the upper edge, so as to form a projecting lip, $b$, which fits into a corresponding recess, $c$, of the cutter-stock C. The cutter is then riveted to stock to hold them together. On one end of cutter B is an angular projection, $b'$, to enable one end of cutter to be rigidly held. The stock C has an upwardly-projecting angle-piece, $c'$, which is perforated to allow it to receive a screw-bolt. D is a plate, which is convexed on the upper side and riveted on one edge to the cutter-stock C, so as to act as a brace or stiffener to the thin steel plate, and also as a guard to the teeth E, which are fastened in a rock-shaft, F. The fastening of these teeth to this rock-shaft is a matter requiring great particularity, because they must be so fastened as to be easily removed and replaced, and yet so that they will be perfectly rigid. I have tried riveting and welding, but the teeth are then so difficult to remove as to be very objectionable. After some thought and experiment I found that these objections might be removed. For this purpose I threaded the shank of these teeth E, (which are made of steel,) holding them by a nut, G, on the end that has been passed through the shaft F, and making a notch on the front side of shaft for each tooth. The shafts F are journaled in the bearings F' between stock C and brace-guard D. H H are hollow standards in which the two shafts F are connected with the train of mechanism that produces their oscillation. Of course these shafts may be vibrated so as to rock both the sifters E E simultaneously in the same direction, but I prefer greatly that they should move always in opposite directions, so that as one is going up the other is always coming down. By this rapid movement, up and down, of vines, bulbs, and loose soil together the soil is first sifted through, then the potatoes dropped on it, and finally the vines left on top of the potatoes. By simply pushing aside the vines the potatoes are seen strung along on the ground, all having been exposed except those so extremely small as to be of little value, and which generally adhere to the roots of the vines. On the inner side of the front end of hollow standard H is cast a projecting apertured wing or bearing-plate, $h$, which supports and to which is bolted the cutter-stock C and brace-guard D, and just above the highest part of this plate is an angular recess, $h^1$. This construction allows both the cutter-stock C and the brace-guard D to be held with the necessary rigidity. The plate or wing $h$ has, at the lower end, a prolongation, and on bottom and top the recesses $h^3\ h^4$. I is a gage-slide, which has a concavity, and fits upon this prolongation, but so as to produce, between the former and the latter, an angular recess, and also a hollow wing, $i^1$, in both of which is received the angular prolongation $b'$ of the cutter B. This serves to support the end of cutter with great firmness. The gage-slide I is provided with a point, $i^2$, like that of a plow, in addition to the wing $i^1$, which has a convex curve on top, while both have a cutting-edge, which acts in conjunction with the edge of cutter B. The two cutters B B are placed with their edges at an angle to each other, and in the concavity thereof, so as to cut all the outside branch feeder-roots before they reach the top root, which may even pass between the cutters and thus allow the bulbs to be stripped therefrom. The arms J and rods K, by which the elbow-lever L, crank-pitman M, shaft N, and gears $n\ n\ n^2\ n^3$ allow the shaft F to be rocked by the axle, are inclosed in the hollow standards H H, which have an opening side, $H^1$, through which they may be removed or applied. This protects them from injury and dirt. These standards H are attached to pendent slotted lugs $h^6$, wherein are inserted an adjustable bolt-pivot, $h^7$, which allows them to be raised or depressed to regulate the depth, and to be turned thereon and be clamped by a nut at different points on a small arc. These standards also have in the rear a slot, $h^8$, which allows them to be slid on a clamp-screw, $h^9$, arranged in an arm, $H^2$, attached to frame of vehicle. The purpose of this mode of attachment is to allow the pitch of shovels and gage-slides to be both regulated by that of the standards. O is the frame, which supports on its rear end the digger and sifter, and is made of metal, concaved or grooved on the under side at $o$, so as to combine great strength and durability with as little weight as possible. P is a lever having the convex curve $p$ and the slot $p^1$ at the upper end. This lever is pivoted at $p^2$ to the standard H, has the lower end guarded and guided between a loop-strap, Q, and the standard, and is vibrated by a prolongation of the pin which connects the rod K with the elbow-lever L. This lever or vine-mover being vibrated as the machine moves forward, the convex curve $p$ alternately moves above and below the angle-edge of standard H, and thus throws up the vines and causes them to pass on over the shovels A without clogging the machine. R is the tongue of the machine, which is pivoted to frame O, and has upon its rear end a foot-platform, S, and therein a slot, $r$, in which works the roll $t$ of the crank T. The latter belongs to a rock-shaft, U, which is operated by the long handle V, whose upper end is brought near the driver-seat W. X is the shaft or axle of the vehicle, which is stationary, and on which are pivoted both the frame O and the wheels Y Y.

Z is a pawl, which works in notches on the rear side of handle.

By thus pivoting the rear of tongue on a frame which is also pivoted on the stationary axle, the driver is always able to simultaneously lift the gage-slides, the shovels, and the sifters out of and off the ground by simply throwing his weight or strength against the foot-plate.

The object of the rock-shaft with crank working in the end of tongue, the rear notched handle, and the pawl is to enable the driver always to regulate the depth of the digger by pulling rearwardly on the lever and adjusting the pawl in a suitable notch.

Having thus described our invention, what we claim as new, and desire to secure by Letters Patent, is—

1. The cutter-stock C having the angle-piece $c'$ combined with a standard, H, having the angular recess $h^1$, as and for the purpose specified.

2. The convex plate D applied to the teeth E and thin steel plate C to form a stop for the one and a stiffener for the other, as described.

3. The tooth E having end-threaded shank, the nut G, and the shaft F having notch $f$ on front side, combined to form a rigid fastening that will also admit of ready removal, as set forth.

4. The two reversely and vertically moving sifters E F, applied directly in the rear of the shovels of a potato-digger, to operate as and for the purpose described.

5. The combination, with cutter-stock C and brace-stop D, of a standard, H, having the bearing-plate $h$, arranged in the manner described.

6. The standards H, in a potato-digger constructed with a concavity and a removable side, H', for receiving and protecting the arms J and rod K, in the manner set forth.

7. The vine-moving lever P having the convex curve $p$ applied on the standard H, as and for the purpose described.

8. The slotted standard H combined with clamp-screw pivot $h^7$ and clamp-bolt $h^9$, as and for the purpose set forth.

DAVID M. KING.
GEORGE E. KING.

Witnesses:
SOLON C. KEMON,
THOS. D. D. OURAND.